April 17, 1962 J. O. PREISIG 3,030,444

TRANSISTOR TELEVISION RECEIVERS

Filed March 24, 1958 2 Sheets-Sheet 1

INVENTOR.
JOSEPH O. PREISIG
BY
W. H. Sprague
ATTORNEY

April 17, 1962 J. O. PREISIG 3,030,444

TRANSISTOR TELEVISION RECEIVERS

Filed March 24, 1958 2 Sheets-Sheet 2

INVENTOR.
JOSEPH O. PREISIG
BY
ATTORNEY

United States Patent Office 3,030,444

Patented Apr. 17, 1962

3,030,444

TRANSISTOR TELEVISION RECEIVERS

Joseph O. Preisig, Trenton, N.J., assignor to Radio Corporation of America, a corporation of Delaware Filed Mar. 24, 1958, Ser. No. 723,199
18 Claims. (Cl. 178—7.3)

This invention relates to transistor television receivers and in particular to transistor deflection and bias supply circuits for television receivers.

One of the problems encountered in the design of transistor deflection circuits for television receivers is occasioned by the fact that transistors are not generally capable of accommodating large voltages. An excessive collector voltage, for example, may destroy the transistor. When used in television deflection circuits the transistor is generally operated as a switch and is turned off by pulses having short rise times. This type of switch operation induces large voltages by the resonating of the leakage inductance and distributed capacitance in the high voltage transformer. Means are usually provided, therefore, for limiting or clipping these large voltages. The energy in the clipped portion of the voltage is usually dissipated and wasted. In a low power and portable transistor television receiver, power is at a premium and the dissipation of energy should be avoided if possible.

The present invention has at one of its objects the provision of an improved transistor deflection circuit wherein the transistor is protected against excessive voltages and the energy of the excessive voltages is used in a beneficial manner.

The design of a television receiver requires that some means be provided for controlling the horizontal deflection oscillator circuit so that it is properly synchronized. According to the present invention, a reference wave may be derived from the circuitry which protects the transistor and this wave compared with the horizontal synchronizing pulses to provide an error voltage which may be applied to the horizontal oscillator of the receiver.

An improved transistor deflection circuit embodying the invention includes a transistor which may, for example, be the horizontal driver stage. To protect the transistor against excessive voltages a unilateral conducting device is connected with the transistor in such a manner that the output voltage of the transistor is limited to a predetermined value. The circuitry including the unilateral conducting device is also used to provide a direct voltage, which is of the proper magnitude to be used as the energy supply for other portions of the receiver. In addition, this novel circuitry provides a sawtooth wave which can be used as a reference wave for comparison with the horizontal synchronizing pulses.

Figure 1:
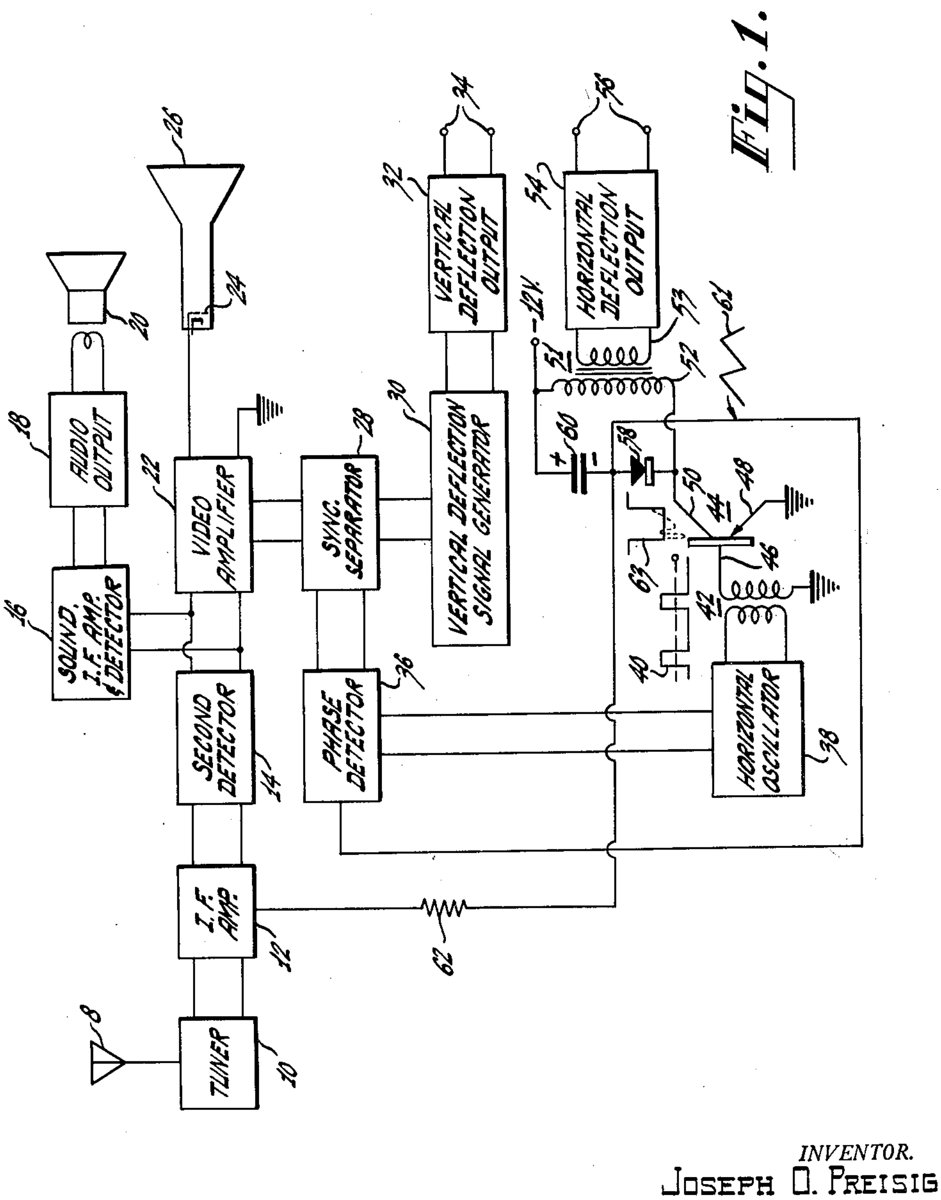
Figure 2:
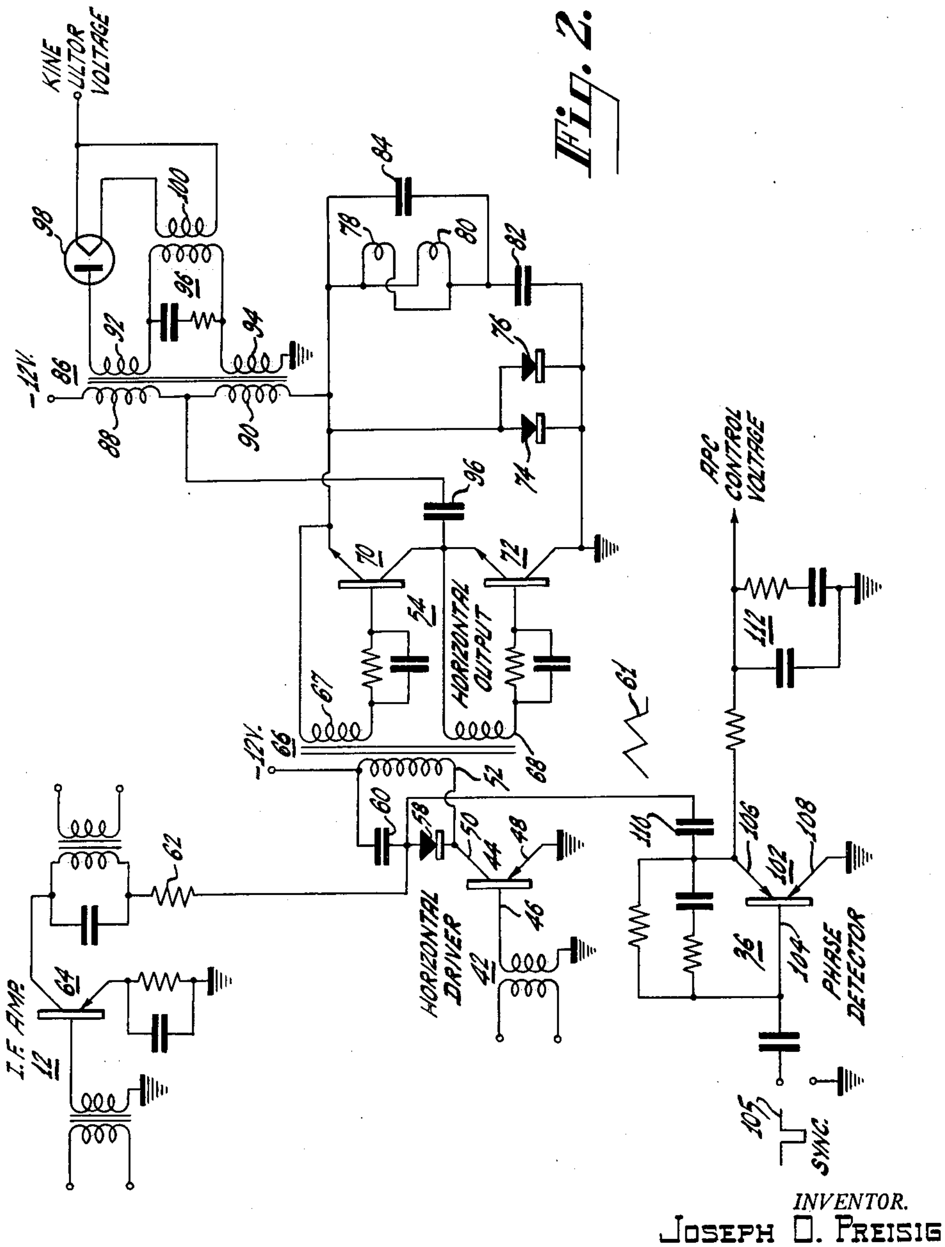

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

FIGURE 1 is a schematic circuit diagram, partially in block diagram form, of a television receiver embodying the invention; and FIGURE 2 is a schematic circuit diagram of transistor intermediate frequency amplifier, horizontal driver, horizontal output, and phase detector stages suitable for use in a receiver of the type illustrated in FIGURE 1 and embodying the invention.

Referring now to the drawings, wherein like parts are indicated by like reference numerals in both figures, and referring in particular to FIGURE 1, a television receiver includes an antenna 8 which receives composite television signals and couples the received signals to a tuner 10. The tuner 10 would normally include, as is conventional, a radio frequency amplifier and a frequency converter for converting the radio frequency signals to intermediate frequency signals. The intermediate frequency signals are amplified by an intermediate frequency amplifier 12 and applied to a second detector 14 for deriving the composite television signals from the intermediate frequency signals. The sound intermediate frequency signals (produced by the beat between the picture carrier and the modulated sound carrier) are amplified and detected in the amplifier and second detector stage 16 and the resultant audio frequency signal is amplified by the audio frequency output stage 18. The amplified audio signal is then applied to a loudspeaker 20 for sound reproduction.

The composite television signals derived from the second detector 14 are amplified by a video amplifier 22 and applied to the control grid 24 of a kinescope 26 for picture reproduction. The composite television signals are also applied to a sync separator circuit 28. The sync separator circuit 28 supplies vertical synchronizing pulses to a vertical deflection signal generator 30. The vertical deflection signal generator 30 is connected to the vertical deflection output circuit 32, the pair of output terminals 34 of which are connected conventionally to the terminals of the kinescope vertical deflection yoke winding (not shown).

Horizontal synchronizing pulses derived from the sync separator circuit 28 are applied to a phase detector 36. The phase of the horizontal synchronizing pulses are compared by the phase detector 36 with the phase of a sawtooth wave, the derivation of which will be subsequently described. The error voltage developed in the phase detector 36 as a result of the phase comparison between the horizontal synchronizing pulses and the sawtooth wave is applied to a horizontal oscillator 38 to synchronize its output with the received synchronizing pulses. The horizontal oscillator 38 is operative to generate a train of positive pulses 40 having the repetition rate of the received horizontal synchronizing pulses.

The horizontal oscillator 38 is coupled through a transformer 42 to the base 46 of a horizontal driver transistor 44. The horizontal driver 44 may be considered to be of the P-N-P junction type and includes an emitter 48 and a collector 50 in addition to the base 46. The emitter 48 of the transistor 44 is connected directly to ground. The collector 50 of this transistor is connected through the primary winding 52 of an output transformer 51 to the negative terminal of a direct current supply source (not shown). The secondary winding 53 of the output transformer 51 is connected to a horizontal deflection output stage 54, the output terminals 56 of which are connected conventionally to the horizontal deflection yoke windings (not shown) of the kinescope 26. As thus far described, the receiver is conventional.

To protect the transistor 44 against excessive collector voltages, to provide an energy supply source for other portions of the receiver, and to provide a sawtooth reference wave, the collector circuit of the transistor 44 includes, in addition to the inductive transformer winding 52, a clipping circuit comprising a unilateral conducting device such as the diode 58 and a capacitor 60. The cathode of the diode 58 is connected to the junction of the primary winding 52 and the collector 50 of the transistor 44. The anode of the diode 58 is connected through the capacitor 60 to the other terminal of the inductor 52, which terminal is connected to the negative terminal of the supply source. Alternatively, the capacitor 60 could be connected to the other terminal of the supply source or ground for the system. The junction of the diode 58 and the capacitor 60 is connected through the decoupling resistor 62 to the intermediate frequency amplifier 12. The junction of the diode 58 and the capacitor 60 is also connected, in accordance with the invention, to the phase detector 36.

In operation, the transistor 44 operates as a switch, and, during the trace portion of the horizontal deflection cycle, is biased in the forward or conducting direction. During this portion of the cycle the voltage at the base 46 is negative, as indicated by the pulse waveform 40, wherein the negative portion between positive pulses represents the base voltage during this portion of the deflection cycle. It should be noted that if an N-P-N junction transistor were used, the polarity of the input pulses would be reversed. Since the transistor 44 is forward biased, current flows in the emitter-collector circuit of the transistor in the direction of the emiter arrow and the current flow through the inductive transformer winding 52 increases in a linear manner. The voltage $$\left(E_L=L\frac{di}{dl}\right)$$

across the winding 52 can theoretically increase (assuming a pure inductance and perfect switching action of the transistor) to a maximum voltage equal to the voltage of the negative supply source. The polarity of this voltage is opposite to that of the supply source so that the voltage on the collector 50 is zero or nearly zero. The capacitor 60 has, it will be asume, gradually charged due to current flow during previous cycles. The voltage across the capacitor 60 has gradually increased in a step fashion and is of a polarity as shown in the circuit diagram. Thus, the anode of the diode 58 is negative relative to the cathode. During this portion of the deflection cycle, therefore, the diode 58 is reverse biased, and, in effect, is an open circuit.

Upon application of a positive pulse from the horizontal oscillator 38 to the base 46 of the transistor 44, the transistor 44 is cut off and current flow in the collector-emitter circuit ceases during the retrace portion of the horizontal deflection cycle. The collector-emitter circuit of the transistor 44 is thus opened.

When current flow through the inductor 52 ceases, due to the opening of the collector-emitter circuit of the transistor 44, the energy stored in the inductor 52 is converted into capacitive energy. The voltage across the inductor 52 thus reverses, and a large voltage pulse 63 of negative polarity is produced at the collector 50 of the transistor. This negative pulse is used to turn off the horizontal deflection output stage. The voltage across the diode 58, at this point in the operating cycle, is such that the diode 58 is conducting in the forward direction. The net voltage across the capacitor 60 is then approximately equal to the voltage of the pulse across the inductor 52 and at the collector 50 of the transistor 44.

The voltage at the collector 50 is thus limited as the diode 58 conducts to add capacitive reactance in the form of the relatively large capacitor 60 to the circuit. If only the distributed capacitance of the inductive winding 52 were present, a high voltage pulse, as indicated by the dotted portion of the pulse 63, would be produced on the collector 50. This is because the energy in the inductor 52

$$(\tfrac{1}{2}\,LI^2_{max.})$$

equals the energy stored in the capacitor 60 ($\tfrac{1}{2}CE^2$). Thus, if the capacitance (C) of the circuit is small, the voltage (E) which is also the voltage at the collector 50, must be large. By provision of the invention, however, the large capacitor 60 is added to the circuit as the diode 58 conducts at the desired clipping level. Accordingly, the circuit capacitance (C) is increased and the voltage (E) across the capacitor 60 and at the collector 50 is decreased. An equilibrium condition is established when the energy stored in the capacitor 60 during the off time is equal to the energy consumed in whatever load resistance is provided for the clipping circuit.

It is, therefore, seen that the clipping circuit including the diode 58, the capacitor 60, and the inductor 52 prevents the collector voltage of the transistor 44 from rising to a level where breakdown of the transistor would be encountered. In additon, this circuitry permits fast rise times of the output pulses. This is because only the relatively small distributed capacitance of the deflection winding is effectively present in the circuit during trace and at the start and end of the pulse rise until the clipping level is reached.

As noted above, the energy stored in the capacitor 60 could, if desired, be dissipated in a load resistor. In accordance with the invention, however, this energy is not wasted but, instead, is used in a beneficial manner. It has been discovered, according to the invention, that the direct voltage at the junction of the diode 58 and the capacitor 60 is of a magnitude which permits its use as a direct-current energy supply for other portions of the receiver. In the present example, this voltage is used as the energy supply for the I.F. amplifier 12 by the connection from the junction of the diode 58 and capacitor 60 through the decoupling resistor 62 to the I.F. amplifier.

In addition, the ripple voltage 61 developed across the storage capacitor 60 is of a sawtooth waveform. This saw-tooth ripple voltage 61 may also be derived from the junction of the capacitor 60 and the diode 58 and may be applied, in accordance with the invention, to the phase detector 36. The phase detector 36, which may be conventional, is operative to compare this sawtooth voltage with the horizontal sync pulses to provide an error voltage which is applied to synchronize the horizontal oscillator 38. Thus, by provision of the invention, the collector circuit of the transistor 44 includes circuit elements which perform four functions. These are (1) breakdown protection of the transistor, (2) the provision of output pulses characterized by fast rise times, (3) an energy supply source for other stages of the receiver, and (4) a source of sawtooth reference voltage for phase control of the horizontal deflection circuits. These functions are, moreover, accomplished with a minimum number of circuit elements.

In practice, the circuit constants may be selected to limit the collector voltage to any desired level. Preferably, however, the collector voltage will be limited to approximately 60 volts, thus providing a 60 volt energy supply source for other portions of the receiver. In a circuit actually built and successfully tested, a type TA1639 transistor and a type 1N58A diode were used with a 12 volt supply source. A clipping level of 60 volts was provided by using an inductor 52 of 70 turns and approximately 5 millihenries of inductance, and a capacitor 60 of 0.25 microfarad. The load resistance provided by the I.F. amplifier 12 was approximately 5600 ohms.

It also has been found in practice that, by using a junction type 1N91 diode for the clipping diode 58, a beneficial shaping of the pulse 63 is effected. In the absence of the diode 58 the pulse 63 would have a shape such as indicated by the broken line. As described, the presence of the diode 58 prevents the pulse from developing a voltage in excess of that indicated by the solid line. The use of the 1N91 type of diode, however, effects reshaping of the pulse at its trailing edge so that the transition from its maximum clipped voltage level to the level indicated for trace portions of the deflection cycle is quite abrupt. This pulse shaping insures that the driver transistor 44 is rendered conductive for emitter-collector current in a much more positive manner than would be the case were the pulse to have the sloping trailing edge indicated by the broken line. Picture jitter, therefore, is eliminated by using a diode of the junction type specified.

In FIGURE 2, reference to which is now made, only those portions of a television receiver are illustrated which are pertinent to the present invention. An intermediate frequency amplifier transistor 64 is connected as a common emitter amplifier in a conventional manner. While only one intermediate frequency transistor amplifier stage has been illustrated, more than one stage would, in practice, be used. These additional stages would be similar to the one illustrated. The horizontal driver transistor 44, which is identical to the horizontal driver transistor of FIGURE 1, is coupled through a transformer 66 having the primary winding 52 and a pair of secondary windings 67 and 68 to a pair of output transistors 70 and 72. The junction of the diode 58 and the capacitor 60 is connected through the primary winding of the intermediate frequency output transformer to the collector of the intermediate frequency amplifier transistor 64. The horizontal driver 44, which operates in an identical manner to its counterpart in FIGURE 1 provides through the resistor 62, and as described above, the energy supply for the I.F. transistor 64. If more than one I.F. stage were used, these could derive their energy supply from the horizontal driver stage by similar connections to the junction of the capacitor 60 and the diode 58.

The transistors 70 and 72 of the horizontal output stage 54 are connected in series for both alternating and direct currents. By using two transistors in series higher voltages may be employed in the operation of the horizontal output circuit. Each of the transistors 70 and 72 may be considered to be of the N-P-N junction type. Input driving signals from the horizontal driver transistor are supplied to the base electrodes of the output transistors 70 and 72 through the respective secondary windings 67 and 68. Thus, input signals are applied in parallel to the transistors 70 and 72. The emitter of the transistor 70 is connected through a pair of unilateral conducting devices such as semi-conductor diodes 74 and 76, which are connected in parallel, to ground. The diodes 74 and 76 are poled for forward conduction in the same direction as reverse emitter-collector current of the transistors 70 and 72. The diodes 74 and 76 insure and improve symmetrical operation of the output transistors 70 and 72 and may improve their response time. The diodes 74 and 76 are particularly desirable if output transistors having the desired symmetry are not available. The emitter of the transistor 70 is also connected through the horizontal winding of the deflection yoke, which includes the coils 78 and 80 connected in parallel, and a capacitor 82 to ground. The capacitor 82 prevents direct current flow through the deflection coils 78 and 80 and improves the linearity of deflection. A capacitor 84 is connected in parallel with the horizontal deflection coils 78 and 80.

A high voltage transformer 86 is provided and includes a pair of primary windings 88 and 90 and a pair of secondary windings 92 and 94. To provide forward bias for the transistor 70, the emitter thereof is connected through the primary windings 90 and 88 to a negative source of direct current operating potential (not shown). To insure proper voltage division between the transistors 70 and 72 a capacitor 96 is connected from the junction of the primary windings 88 and 90 to the junction of the emitter of the output transistor 72 and the collector of the output transistor 70. This connection provides equal division of signal voltage between the transistors as the output voltage swings across the primary circuit of the high voltage transformer 86.

The horizontal output transistors 70 and 72 operate as switches in a manner similar to the driver transistor 44. Accordingly, during trace intervals, the transistors 70 and 72 conduct current in the forward direction and current increases in a linear manner through the coils 78 and 80 of the horizontal yoke winding. During retrace intervals, the transistors 70 and 72 are turned off by the application of negative pulses from the horizontal driver transistor 44 to the base electrodes of the output transistors. The energy stored in the deflection coils 78 and 80 then discharges in a half-wave oscillatory manner. When the negative pulse to the base electrodes terminates, a forward bias condition for the output transistors is restored and the cycle repeats. Thus, sawtooth current is provided to horizontally deflect the electron beam of the kinescope.

A harmonic trap circuit 96 is connected between the secondary windings 92 and 94 of the high voltage transformer 86, as described and claimed in a copending application for Joseph A. Preisig entitled "Television Deflection Circuits" filed on March 24, 1958, Serial No. 723,254. An auxiliary winding 100 is coupled with the harmonic trap circuit 96, and is connected to energize the filament of a high voltage rectifier 98. The harmonic trap circuit is operative to absorb undesired transients at harmonic frequencies of the horizontal deflection frequency. The energy absorbed by the trap circuit 96 is then used to heat the filament of the high voltage rectifier 98.

The phase detector stage 36 of the circuit diagram of FIGURE 2 comprises a transistor 102, which is preferably of the symmetrical type and is illustrated as being a P-N-P junction transistor. The transistor 102 includes a base electrode 104, to which negative horizontal synchronizing pulses 105 are applied, and two substantially identical electrodes 106 and 108, which alternately serve as emitter and collector electrodes, depending on the polarity of the voltages which are applied to the transistor 102. The sawtooth voltage wave 61, which is derived from the junction of the diode 58 and the capacitor 60, as described in connection with FIGURE 1, is applied through a capacitor 110 to the electrode 106 of the symmetrical transistor 102. The electrode 106 of the transistor 102 serves as the output electrode for the transistor. An error voltage is derived from this electrode for controlling the horizontal oscillator, such as the horizontal oscillator 38 of FIGURE 1. The electrode 106 may be connected through a filter network 112 to the horizontal oscillator.

The operation of the transistor phase detector 102 depends on the transistor 102 conducting only when the horizontal synchronizing pulses 105 are applied to the base 104 of this transistor. Thus, if the instantaneous sawtooth voltage which is applied to the electrode 106 is positive at the instant the negative sync pulse triggers the transistor 102 into a conducting condition, the electrode 106 will serve as the emitter electrode and the electrode 108 will serve as the collector. Current will then travel in a direction as indicated by the arrow on the electrode 106 and an error voltage of negative polarity will be produced at the electrode 106 which is coupled through the filter network 112 to the horizontal oscillator. Conversely, if the sawtooth voltage 61 is negative when the sync pulses 105 arrive at the base 104, the electrode 106 serves as a collector and the electrode 108 becomes the emitter. Current flow through the transistor 102 is now reversed, and flows in the direction of the arrow on the electrode 108. Thus a positive error voltage is produced on the electrode 106, which will be applied through the filter network 112 to the horizontal oscillator. In this manner the transistor 102 acts as a switch to produce an error voltage whose polarity depends on the part of the sawtooth wave which is applied to the electrode 106 at the instant the horizontal synchronizing pulses 105 are applied to the base 104. If the sawtooth wave 61 is passing through zero or ground potential when the horizontal synchronizing pulses 105 are applied to the base there will be no error voltage produced on the electrode 106.

It is to be understood that the circuit including the diode 58, the capacitor 60, and the inductive winding 52 could, if desired, be used in a horizontal output stage, rather than in the driver stage illustrated, if only one transistor was used for deflection purposes. Moreover, the voltage used as an energy supply could be applied to portions of the receiver other than the intermediate frequency amplifier stage if desired.

The invention provides improved operation of the deflection circuits by protecting the transistors used therein. In addition, a voltage is derived from these novel circuits which may be used as an energy supply for other stages of the receiver. The circuitry embodying the invention also provides a convenient source of a sawtooth wave for phase comparison purposes.

What is claimed is:

1. In a transistor television receiver, the combination comprising: a plurality of signal processing and translating stages; beam deflection apparatus including a driver stage and an inductive output stage, said driver stage including a transistor having input and output circuits, said input circuit being adapted to control the operation of said transistor whereby it is rendered conductive and non-conductive during alternate periods, and said inductive output stage being coupled to said transistor output circuit, thereby applying high voltage pulses to said transistor output circuit during said non-conductive periods; means including a unilateral conducting device connected with said transistor for preventing destruction thereof by said high voltage pulses; means including said unilateral conducting device for converting said high voltage pulses into a direct energizing voltage; and means for applying said energizing voltage to at least one of said signal processing and translating stages as the sole energy supply therefor.

2. In a transistor television receiver, the combination comprising: a plurality of signal processing and translating stages; a phase detector circuit; beam deflection apparatus operative in a succession of deflection cycles each having trace and retrace periods, said apparatus including a driver stage and an inductive output stage, said driver stage including a transistor having input and output circuits, said input circuit being adapted to receive controlling pulses by which said transistor is alternately rendered conductive and non-conductive respectively during said trace and retrace periods, and said inductive output stage being coupled to said transistor output circuit, thereby developing voltage pulses of relatively large amplitude in said transistor output circuit during said retrace periods; means including a unilateral conducting device connected with said transistor for preventing destruction thereof by said voltage pulses of large amplitude; means including said unilateral conducting device for converting said voltage pulses of large amplitude into a direct energizing voltage; means for applying said energizing voltage to at least one of said signal processing and translating stages as the sole energy supply therefor; further means including said unilateral conducting device for developing a reference voltage of sawtooth waveform; and means for applying said reference voltage to said phase detector circuit.

3. In a transistor television receiver of video signals including horizontal deflection synchronizing pulses, the combination comprising: a plurality of signal processing and translating stages including a transistor intermediate frequency amplifier circuit and a transistor phase detector; horizontal beam deflection apparatus operative in a succession of horizontal deflection cycles each having trace and retrace periods, said apparatus including a driver stage and an output stage, said driver stage including a transistor switch having base, emitter and collector electrodes connected for common emitter amplifying operation and an output transformer including a primary winding connected with said collector electrode, and said output stage including a secondary winding of said transformer effectively coupled to said transistor collector electrode; a series-connected storage capacitor and a diode connected in parallel with said primary winding; means including a source of input pulses connected with said transistor base electrode for rendering said transistor conductive during said trace periods and non-conductive during said retrace periods to provide linear current flow through said primary transformer winding during said trace periods and to produce voltage pulses at said collector electrode during said retrace periods, said diode being poled so as to be conductive in response to said voltage pulses, thereby to limit the amplitude thereof to a predetermined maximum value to protect said transistor switch; means connected with the junction of said diode and said capacitor for developing a direct energizing voltage and for applying said direct energizing voltage to said transistor intermediate frequency amplifier as the sole energy therefor; and further means connected with the junction of said diode and said capacitor for developing a ripple voltage of sawtooth waveform from said capacitor and for applying said ripple voltage to said transistor phase detector for comparison with said received horizontal synchronizing pulses.

4. In a transistor television receiver, the combination comprising: a plurality of signal processing and translating stages; horizontal beam deflection apparatus operative in a succession of horizontal deflection cycles each having trace and retrace periods, said apparatus including a driver stage and an inductive output stage, said driver stage including a transistor having input and output circuits, said input circuit being adapted to control the operation of said transistor in response to controlling pulses whereby said transistor is rendered conducting during said trace periods and non-conducting during said retrace periods, and said inductive output stage being coupled to said transistor output circuit, thereby applying high voltage pulses to said transistor output circuit during said retrace periods; means including a unilateral conducting device connected with said transistor for preventing destruction thereof by said high voltage pulses; means including said unilateral conducting device for converting said high voltage pulses into a direct energizing voltage; and means for applying said direct energizing voltage to at least one of said signal processing and translating stages as the sole energy supply therefor.

5. The combination defined in claim 4 wherein said unilateral conducting device is a diode connected in said transistor output circuit and so poled as to be forward biased in response to said high voltage pulses during said retrace periods of the horizontal deflection cycles.

6. In a transistor television receiver, the combination comprising: a plurality of signal processing and translating stages; horizontal beam deflection apparatus including a driver stage and an inductive output stage, said driver stage including a transistor switch having base, emitter and collector electrodes, said inductive output stage being coupled to said transistor collector, and said transistor base being adapted to receive controlling pulses by which said transistor is periodically rendered non-conductive, thereby developing voltage pulses at said transistor collector; a series-connected unilateral conducting device and a storage capacitor connected effectively in parallel with said inductive output circuit, said unilateral conducting device being connected with said transistor collector and poled so as to be rendered conductive in response to said non-conductive condition of said transistor to limit the amplitude of said voltage pulses and thus to protect said transistor; means for developing a direct energizing voltage from the junction of said capacitor and said unilateral conducting device; means for applying said direct energizing voltage to at least one of said signal processing and translating stages as the sole energy supply therefor; means for deriving a sawtooth voltage directly from the junction of said capacitor and said unilateral conducting device; and means for applying said sawtooth voltage to another of said signal processing and translating stages as a horizontal deflection synchronizing reference voltage therefor.

7. In a transistor television receiver, the combination comprising: a plurality of signal processing and translating stages; horizontal beam deflection apparatus including a driver stage, an ouput stage and a direct current supply source, said driver stage including a transistor switch having base, emitter and collector electrodes, said output stage including an inductor having a pair of terminals one of which is connected with said transistor collector and the other of which is connected with said direct current supply source; means for applying input pulses to said transistor base to render said transistor initially conductive to provide a substantially linear increase in current through said inductor and subsequently non-conductive to provide a voltage pulse on said transistor collector derived from said inductor; a unilateral conducting device connected with said transistor collector and poled so as to be rendered conductive in response to said non-conductive condition of said transistor to limit the amplitude of said voltage pulses and thus to protect said transistor; a storage capacitor connected between said unilateral conducting device and said other terminal of said inductor; means for deriving a direct energizing voltage from the junction of said capacitor and said unilateral conducting device; and means for applying said direct energizing voltage to at least one of said signal processing and translating stages as the sole energy supply therefor.

8. In a transistor television receiver of video signals including horizontal deflection synchronizing pulses, the combination comprising: a plurality of signal processing and translating stages; a phase detector circuit responsive to said horizontal synchronizing pulses; horizontal beam deflection apparatus operative in a succession of horizontal deflection cycles each having trace and retrace periods, said apparatus including a horizontal oscillator to provide a series of pulses at the horizontal deflection rate, a driver stage and an inductive output stage, said driver stage including a transistor having input and output circuits, said input circuit being coupled to said horizontal oscillator to receive controlling pulses by which said transistor is rendered conducting during said trace periods and non-conducting during said retrace periods, and said inductive output stage being coupled to said transistor output circuit so that current in said output stage increases linearly during said trace period and decreases rapidly during said retrace periods, thereby applying high voltage pulses to said transistor output circuit during said retrace periods; means including a unilateral conducting device connected with said transistor for preventing destruction thereof by said high voltage pulses; means including said unilateral conducting device for developing a reference voltage of sawtooth waveform; and means for applying said reference voltage to said phase detector circuit for comparison with said horizontal deflection synchronizing pulses to develop an error voltage for application to said horizontal oscillator.

9. In a transistor television receiver, the combination comprising: a transistor intermediate frequency amplifier circuit; a transistor phase detector; transistor horizontal deflection apparatus operative in a succession of horizontal deflection cycles each having trace and retrace periods, said apparatus including a driver stage and an output stage, said driver stage including a transistor having base, emitter and collector electrodes, said output stage including a transformer having a primary winding connected with said collector electrode; a series-connected storage capacitor and diode connected effectively in parallel with said primary winding; means including a source of input pulses connected with said base electrode for rendering said transistor conductive during said trace periods and non-conductive during said retrace periods so as to provide substantially linear current flow through said primary winding during said trace periods and to produce voltage pulses on said collector electrode during said retrace periods, said diode being poled so as to be conductive in response to said voltage pulses to limit the amplitude thereof and thus protect said transistor; means connected with the junction of said diode and said capacitor for deriving a direct energizing voltage therefrom and for applying said voltage to said transistor intermediate frequency amplifier as the sole energy supply therefor; and further means connected with the junction of said diode and said capacitor for deriving a ripple voltage of sawtooth waveform from said capacitor and for applying said ripple voltage to said transistor phase detector.

10. In a television receiver, the combination comprising: a plurality of signal processing and translating stages; horizontal beam deflection apparatus including a driver stage and an output stage, said driver stage including a transistor switch having base, emitter and collector electrodes, said output stage including an inductor connected with said collector electrodes; means for applying input pulses to said base electrode to render said transistor periodically non-conductive and thus to provide a voltage pulse derived from said inductor on said collector electrode; a unilateral conducting device connected with said collector electrode and said inductor and poled so as to be rendered conductive for current derived from said inductor in response to said non-conductive condition of said transistor to thereby limit the amplitude of said voltage pulses and thus protect said transistor; means for deriving a direct energizing voltage from said unilateral conducting device; and means for applying said direct energizing voltage to at least one of said signal processing and translating stages as the sole energy supply therefor.

11. In a transistor television receiver, the combination comprising: beam deflection apparatus operative in a succession of horizontal deflection cycles each having trace and retrace periods, said apparatus including a driver stage, an inductive output stage and a phase detector circuit, said driver stage including a transistor having input and output circuits, said input circuit being adapted to control the state of conduction of said transistor such that it has one state during said trace periods and another state during said retrace periods, and said inductive output stage being coupled to said transistor output circuit, thereby applying high voltage pulses to said transistor output circuit during said retrace periods; means including a unilateral conducting device connected with said transistor for preventing destruction thereof by said high voltage pulses; means including said unilateral conducting device for developing a reference voltage of sawtooth waveform; and means for applying said reference voltage to said phase detector circuit.

12. In a transistor television receiver of video signals including horizontal deflection synchronizing pulses, the combination comprising: a plurality of signal processing and translating stages; beam deflection apparatus operative in a succession of horizontal deflection cycles each having trace and retrace periods, said apparatus including a driver stage and an inductive output stage, said driver stage including a transistor switch having input and output circuits, said input circuit being adapted to control the conduction of said transistor switch between two states respectively during said trace and retrace periods, said output circuit being coupled to said inductive output stage, and a unilateral conducting device and a capacitor being connected to both said output circuit and said inductive output stage, said unilateral conducting device being so poled as to prevent breakdown of said transistor switch during said retrace periods; means including said unilateral conducting device for developing a direct energizing voltage from said inductive output stage; means for applying said direct energizing voltage to at least one of said signal processing and translating stages as the sole energy supply therefor; further means including said capacitor for generating a reference voltage of sawtooth waveform from said inductive output stage; and means for applying said reference voltage to said phase detector circuit for comparison with said received horizontal synchronizing pulses.

13. In a transistor television receiver, the combination comprising: beam deflection apparatus including a driver stage, an inductive output stage and a phase detector circuit, said driver stage including a transistor having input and output circuits, said input circuit being adapted to control the operation of said transistor whereby it is rendered appreciably conductive and substantially non-conductive during alternate periods, and said output circuit being coupled to said inductive output stage, thereby applying high voltage pulses to said transistor during said substantially non-conductive periods; means including a unilateral conducting device connected with said transistor for preventing destruction thereof by said high voltage pulses; a storage capacitor connected in series with said unilateral conducting device; means for deriving a ripple voltage of sawtooth waveform directly from said capacitor; and means for applying said ripple voltage to said phase detector circuit.

14. In a transistor television receiver of video signals including horizontal deflection synchronizing pulses, the combination comprising: a plurality of signal processing and translating stages; beam deflection apparatus operative in a succession of horizontal deflection cycles each having trace and retrace periods, said apparatus including a driver stage and an inductive output stage, said driver stage including a transistor having input and output electrodes, said input electrode being adapted to receive input pulses by which said transistor is alternately rendered conductive and non-conductive respectively during said trace and retrace periods, and said output stage including an inductor connected with said output electrode, thereby developing voltage pulses of large amplitude during said retrace periods; a phase detector circuit; a series-connected unilateral conducting device and a capacitor connected effectively in parallel with said inductor, said unilateral conducting device being poled so as to prevent destruction of said transistor by said voltage pulses of large amplitude; means including said unilateral conducting device for developing a direct energizing voltage; means for applying said direct energizing voltage to at least one of said signal processing and translating stages as the sole energy supply therefor, further means including said capacitor for developing a reference voltage of sawtooth waveform; and means for applying said reference voltage to said phase detector circuit for comparison with said received horizontal synchronizing pulses.

15. In a transistor television receiver, the combination comprising: transistor horizontal deflection apparatus operative in a succession of horizontal deflection cycles each have trace and retrace period, said apparatus including a driver stage and an output stage, said driver stage including a transistor having base, emitter and collector electrodes and the primary winding of an output transformer connected with said collector electrode, and said output stage including a secondary winding of said transformer effectively coupled to said collector electrodes; a transistor intermediate frequency amplifier circuit; a transistor phase detector; means including a source of input pulses connected with said base electrode for rendering said transistor conductive during said trace periods and non-conductive during said retrace periods to provide linear current flow through said primary transformer winding during said trace periods and to provide voltage pulses at said collector electrode during said retrace periods, a series-connected diode and a storage capacitor connected effectively in parallel with said primary transformer winding, said diode being poled so as to limit the amplitude of said voltage pulses and thus to protect said transistor; means connected with said diode for developing a direct voltage and for applying said direct voltage to said transistor intermediate frequency amplifier circuit as the sole energy supply therefor; and further means connected with said capacitor for developing a ripple voltage of sawtooth waveform and for applying said ripple voltage to said transistor phase detector.

16. In a television receiver, the combination comprising: a plurality of signal processing and translating stages; horizontal beam deflection apparatus operative in a succession of horizontal deflection cycles each having trace and retrace periods, said apparatus including a driver stage and an output stage, said driver stage including a transistor having base, emitter and collector electrodes, and said output stage including an inductor having a pair of terminals one of which is connected with said collector electrode; means coupled to said transistor to render it conductive during said trace periods to provide a linear increase in current flow through said inductor; means coupled to said transistor to render said transistor non-conductive during said retrace periods to provide voltage pulses on said collector electrode; a diode directly connected with said collector electrode and poled so as to be rendered conductive in response to a non-conductive condition of said transistor, thereby to limit the amplitude of said voltage pulses and thus to protect said transistor; a storage capacitor connected in series with said diode and with the other terminal of said inductor; means connected with the junction of said diode and said capacitor for developing a direct energizing voltage from said diode; and means for applying said direct energizing voltage to at least one of said signal processing and translating stages as the sole energy supply therefor.

17. In a transistor television receiver, the combination comprising: a plurality of signal processing and translating stages; beam deflection apparatus including a driver stage and an output stage, said output stage including an inductor, and said driver stage including a transistor having input and output circuits, said output circuit being coupled to said inductor, and said input circuit being adapted to so control conduction in said transistor as to provide output current flow through said inductor during said trace periods and to prevent the flow of output current through said inductor during said retrace periods, thereby producing relatively large amplitude pulses in said output circuit; means including a unilateral conducting device connected with said transistor output circuit for preventing destruction of said transistor by said large amplitude voltage pulses exceeding a predetermined amplitude; means connected with said unilateral conducting device for developing a direct energizing voltage; and means for applying said direct energizing voltage to at least one of said signal processing and translating stages as the sole energy supply therefor.

18. In a transistor television receiver, the combination comprising: a plurality of signal processing and translating stages; beam deflection apparatus operative in a succession of horizontal deflection cycles each having trace and retrace periods, said apparatus including a driver stage and an inductive output stage, said driver stage including a transistor having input and output circuits, said input circuit being adapted to control the state of conduction of said transistor such that it has one state during said trace periods and another state during said retrace periods, and said inductive output stage being coupled to said transistor output circuit, thereby applying high voltage pulses to said transistor output circuit during said retrace periods; a diode connected to said transistor and poled so as to prevent breakdown of said transistor during said retrace periods; means including said diode for developing a direct current voltage; and means for applying said direct current to at least one of said signal processing and translating stages as the sole energy supply therefor.

References Cited in the file of this patent

UNITED STATES PATENTS

| | | |
|---|---|---|
| 2,708,689 | Vonderschmitt | Mar. 17, 1955 |
| 2,707,206 | Loughlin | Apr. 26, 1955 |
| 2,747,136 | Herzog | May 22, 1956 |
| 2,870,251 | Janssen | Jan. 20, 1959 |

OTHER REFERENCES

Rider Television Manual, vol. 7, Westinghouse TV, pp. 7–5, copyrighted 1951.